United States Patent
Blatchley et al.

(10) Patent No.: US 10,118,460 B1
(45) Date of Patent: Nov. 6, 2018

(54) VEHICLE CHARGE AND CLIMATE CONTROL SYSTEM

(71) Applicant: FORD GLOBAL TECHNOLOGIES, LLC, Dearborn, MI (US)

(72) Inventors: Timothy Noah Blatchley, Dearborn, MI (US); Angel Fernando Porras, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1 day.

(21) Appl. No.: 15/584,788

(22) Filed: May 2, 2017

(51) Int. Cl.
| | |
|---|---|
| G05D 3/12 | (2006.01) |
| G05D 5/00 | (2006.01) |
| G05D 9/00 | (2006.01) |
| G05D 11/00 | (2006.01) |
| B60H 1/00 | (2006.01) |
| H01M 10/613 | (2014.01) |
| H01M 10/625 | (2014.01) |
| B60H 1/32 | (2006.01) |

(52) U.S. Cl.
CPC ......... *B60H 1/004* (2013.01); *B60H 1/00428* (2013.01); *B60H 1/00878* (2013.01); *H01M 10/613* (2015.04); *H01M 10/625* (2015.04); *B60H 1/3208* (2013.01)

(58) Field of Classification Search
CPC ............................ B60H 1/004; B60H 1/00428; B60H 1/00878; B60H 1/3208; H01M 10/625; H01M 10/613
USPC .......................................................... 700/297
See application file for complete search history.

(56) References Cited

U.S. PATENT DOCUMENTS

| | | | |
|---|---|---|---|
| 2009/0107743 A1* | 4/2009 | Alston | B60H 1/00428 180/65.21 |
| 2012/0316713 A1* | 12/2012 | Pfefferl | F04C 28/06 701/22 |
| 2013/0234651 A1 | 9/2013 | Buford | |
| 2014/0121866 A1* | 5/2014 | Dangler | H02J 7/0029 701/22 |
| 2016/0263961 A1 | 9/2016 | Treharne et al. | |
| 2016/0339760 A1 | 11/2016 | Dunn et al. | |

* cited by examiner

*Primary Examiner* — Ziaul Karim
(74) *Attorney, Agent, or Firm* — David B. Kelley; Brooks Kushman P.C.

(57) ABSTRACT

A hybrid electric vehicle (HEV) and method of operation, which include an engine and an electric machine and storage battery coupled to power electronics, and a compressor and a chiller each having cooling capacities and coupled to refrigerant and coolant distribution and thermal management systems. The HEV also includes one or more controllers configured to charge the battery, and to adjust and control a charge-rate and cabin, battery, and coupled power electronics temperatures. The temperatures and charge-rate are controlled according to cooling needs established from a predetermined cabin temperature and charge-time, and actual temperatures of the cabin, battery, and power electronics. The charge-rate is increased, reducing the charge-time, as the predetermined cabin temperature is increased to reduce cabin cooling need. The controller is also configured to generate a capacity alert when the cooling needs exceed the capacity, and to enable prioritization of cooling-capacity between cabin comfort and charge-rate and time.

9 Claims, 6 Drawing Sheets

VEHICLE CHARGE AND CLIMATE CONTROL SYSTEM

TECHNICAL FIELD

The disclosure relates to direct current fast charge and climate control systems in hybrid electric vehicles.

BACKGROUND

In hybrid electric vehicles (HEVs), passenger cabin comfort and cooling of electric vehicle charging components are managed in various ways during vehicle operation. For example, when HEVs are stationary during direct current, fast-charge (DCFC) charging events, vehicle occupants may desire continued cabin comfort. Some HEVs incorporate an engine-mounted and/or electric compressor(s), and associated coolant and refrigerant systems having cooling capacities, which are used to meet cooling demands. Such cooling demands arise from the need to cool the battery, power electronics, vehicle cabin, and other components.

DCFC and other charging events may cause a traction battery and power electronics to require cooling to control temperatures components that may heat during charging. Preferred cabin comfort may not be possible during warmer weather in view of DCFC charge-time and power transfer efficiencies that require cooling of vehicle components. Such cooling needs and demands consume cooling capacity. When available cooling capacity is exceeded by demand for cooling the vehicle components and the cabin, vehicle component cooling may be prioritized over cabin cooling.

SUMMARY

One or more of a hybrid electric vehicle (HEV), an electric vehicle (EV), and/or a plug-in hybrid electric vehicle (PHEV) includes one or more of an internal combustion engine, and/or an electric machine and storage battery coupled to power electronics. At least one of an engine mounted or driven and/or an electrically operated compressor and/or chiller are incorporated, and each are configured with cooling capacities and are coupled to refrigerant and coolant distribution and thermal management systems. The EV/PHEV/HEV (hereafter referred to as "HEV" but intended to also include EVs and PHEVs) also includes one or more controllers coupled to these and other HEV components, and configured to charge the battery, and to adjust and control a charge-rate and charge-time therefor. The controller(s) also manage(s) cooling capacity (CC) distribution to control the temperatures of the cabin, and battery and coupled power electronics. The temperatures and charge-rate are controlled according to cooling needs (CNs) established from an ambient temperature within and external to the HEV, a predetermined cabin temperature and charge-time, as well as the instantaneous temperatures of the cabin, and the battery and power electronics.

To enable DCFC of the battery when HEV is parked and stationary, the controllers are adapted to increase the charge-rate to decrease the charge-time of the batteries, while distributing the CC to the cabin and to the battery and power electronics to control temperatures to be within preferred ranges that optimize charge and life-cycle efficiency. If the predetermined cabin temperature and/or target temperature/setting is increased, which reduces CN of the cabin, less cooling capacity is needed to cool the cabin. In turn, more CC is available for and can be utilized for thermally managing the battery and power electronics during fast charging.

The controller is also configured to generate a capacity alert signal when the cooling-needs or CN for the cabin, the battery, and the power electronics exceed the CC or total cooling-capacity of the vehicle. The capacity alert signal may be used to enable prioritization of distribution of CC between cabin comfort and charge-rate.

The disclosure contemplates the HEV to also include at least one controller or controllers coupled to and configured to charge the battery in response to a direct-current-fast-charge (DCFC) signal, and to adjust and control the temperatures of a vehicle cabin, and the battery and coupled power electronics. The controller(s) also adjust a battery charge-rate according to an ambient temperature within and outside the HEV, a predetermined cabin temperature and a predetermined charge-time. As the controller(s) increase the charge-rate, the charge-time will decrease, and CN for the battery and power electronics will rise. Depending upon preferences for HEV cabin comfort during such DCFC events, the predetermined cabin temperature may be increased to enable CC to be prioritized for thermal management of the battery and power electronics during charging. The HEV also includes a refrigerant and/or chiller, that are coupled to the controller(s), which have the CC. The one or more controllers are further configured to establish the cooling capacity-need or cooling-need (CN) utilizing the ambient temperature, which may be an ambient temperature external to the HEV and/or a current cabin temperature. The controllers also establish the CC using one or more of the predetermined: (a) cabin temperature, (b) charge-rate, and (c) charge-time, and the temperatures of the battery and power electronics.

If the CN exceeds the CC, the controller(s) are further configured to generate and communicate a capacity-alert signal. In response, the controller(s) receive a charge-comfort-priority (CCP) signal, which includes data that establishes whether a selected and/or target cabin temperature, comfort preference should be prioritized over other cooling requirements of the HEV. For example, the controller(s) can be commanded by the CCP signal to enable whether the predetermined or another preferred and/or target cabin temperature should be attained and maintained as a priority over the cooling required to cool the battery and power electronics according to the predetermined charge-rate and charge-time. According to the CCP signal, the controller(s) thereafter adjust the predetermined cabin temperature and charge-time and may prioritize maintaining a more preferred cabin temperature, minimizing the charge-time, and may instead prioritize balancing and adjusting either cabin temperature or charge-time within possibly desirable ranges of temperatures and charge-times.

The controller(s) is/are further configured to control distribution of CC in a thermal management system of the HEV such that a first portion of the CC is apportioned to control the temperatures of the battery and power electronics according to the CCP signal and the adjusted charge-rate. A remaining portion of the CC is distributed to control the cabin temperature to the extent afforded by what remains of the CC, which prioritizes control of the temperatures of the battery and the power electronics over cabin comfort and cooling. In contrast, the CCP signal may be configured to command and maintain a cabin temperature over other cooling needs, which may cause an increased charge-time. This latter example enables maintaining the cabin temperature at the expense of increasing the charge-time. In this arrangement, the controllers are further configured to distribute a first portion of the CC to control the cabin temperature according to the CCP signal. A remaining CC portion is distributed to control the temperature of the battery and power electronics according to the adjusted and decreased charge-rate, and to the extent possible in view of the remaining CC.

In variations of the disclosure, the CCP signal includes information to command a minimum charge-time that can enable battery and power electronics cooling priority over cabin cooling, which may cause an increased cabin temperature. In this variation, the controller(s) is/are further configured to distribute a first portion of the CC to the battery and power electronics according to the CCP signal, which enables the minimum charge-time. A remaining CC portion is distributed and/or apportioned to control the cabin temperature, which may increase. In any of these arrangements, the controller(s) may be further configured to decrease the charge-rate of the battery such that the charge-time increases, which may be in response to the CCP signal commanding controlled cooling of and/or a decrease in the cabin temperature, which in turn may cause the total cooling requirements for the cabin, battery, and power electronics to exceed the CC.

In other configurations, the disclosure is directed to the controller(s) being also configured to distribute a first portion of the CC to control the temperature of the battery and power electronics to enable the commanded charge-time and charge-rate, and to distribute a reduced remaining portion of the CC to control the temperature the cabin. These configurations may be enabled in response to the CCP signal commanding a minimum charge-time and a maximum charge-rate. These and other variations also contemplate the controller further configured to periodically re-establish the CN from the ambient temperature, and instantaneous cabin, battery, and power electronics temperatures. If the combined CN of the cabin, battery, and power electronics during DCFC does not exceed the CC, the controller(s) may be further configured to increase the charge-rate to a maximum that minimizes the charge-time, and to distribute a first-portion of the CC to the battery and power electronics, and to distribute as much of a remaining portion of the CC as may be needed to maintain the predetermined cabin temperature. When the combined, total CN does not exceed the CC, a surplus, unneeded portion of the CC may remain unutilized.

The disclosure also contemplates methods of controlling a vehicle that includes charging a battery in response to a DCFC signal. As with previous configurations, the cabin, battery, and power electronics temperatures are adjusted and controlled by a controller or controllers. A battery charge-time is also adjusted by the controller(s) according to a predetermined: (a) cabin temperature and (b) charge-time, such that the charge-time decreases as the charge-rate and cabin temperature is increased. A compressor and/or chiller having a cooling-capacity (CC) are also provided and are coupled with the controller(s). The method is further directed to establishing by the controller a cooling-need (CN) from an ambient temperature, the predetermined cabin temperature and charge-time, and the temperatures of the battery and power electronics. As with preceding arrangements, the method communicates a capacity-alert signal when the CN exceeds the CC, and receives in response a charge-comfort-priority (CCP) signal. The predetermined cabin temperature and charge-time are adjusted and controlled by the controller according to the CCP signal.

The method of the disclosure also includes distributing by the controller: (a) a first portion of the CC to control the temperature of the battery and power electronics according to the CCP signal and the adjusted charge-rate, and (b) a remaining CC portion to control the cabin temperature. The method further commands with the CCP signal, a cabin temperature that when decreased, may cause an increased charge-time, if the combined or total CN of the cabin and the battery and power electronics exceeds the CC. This CCP signal also distributes first and remaining CC portions to control the temperatures of the cabin and the battery and power electronics according to the adjusted and increased or decreased charge-rate. The method also contemplates commanding by the controller a minimum charge-time that causes an increased cabin temperature, as well as a controlled cabin temperature and an increased charge-time. In this arrangement, the method further enables distributing by the controller a first and remaining portions of the CC between the battery and power electronics and the cabin temperature, according to the CCP signal and enabling the adjusted and/or minimum charge-time.

This summary of the implementations and configurations of the HEVs and described components and systems introduces a selection of exemplary implementations, configurations, and arrangements, in a simplified and less technically detailed arrangement, and such are further described in more detail below in the detailed description in connection with the accompanying illustrations and drawings, and the claims that follow.

This summary is not intended to identify key features or essential features of the claimed technology, nor is it intended to be used as an aid in determining the scope of the claimed subject matter. The features, functions, capabilities, and advantages discussed here may be achieved independently in various example implementations or may be combined in yet other example implementations, as further described elsewhere herein, and which may also be understood by those skilled and knowledgeable in the relevant fields of technology, with reference to the following description and drawings.

BRIEF DESCRIPTION OF THE DRAWINGS

A more complete understanding of example implementations of the present disclosure may be derived by referring to the detailed description and claims when considered with the following figures, wherein like reference numbers refer to similar or identical elements throughout the figures. The figures and annotations thereon are provided to facilitate understanding of the disclosure without limiting the breadth, scope, scale, or applicability of the disclosure. The drawings are not necessarily made to scale.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As those of ordinary skill in the art should understand, various features, components, and processes illustrated and described with reference to any one of the figures may be combined with features, components, and processes illustrated in one or more other figures to produce embodiments that should be apparent to those skilled in the art, but which may not be explicitly illustrated or described. The combinations of features illustrated are representative embodiments for typical applications. Various combinations and modifications of the features consistent with the teachings of this disclosure, however, could be desired for particular applications or implementations, and should be readily within the knowledge, skill, and ability of those working in the relevant fields of technology.

Figure 1:
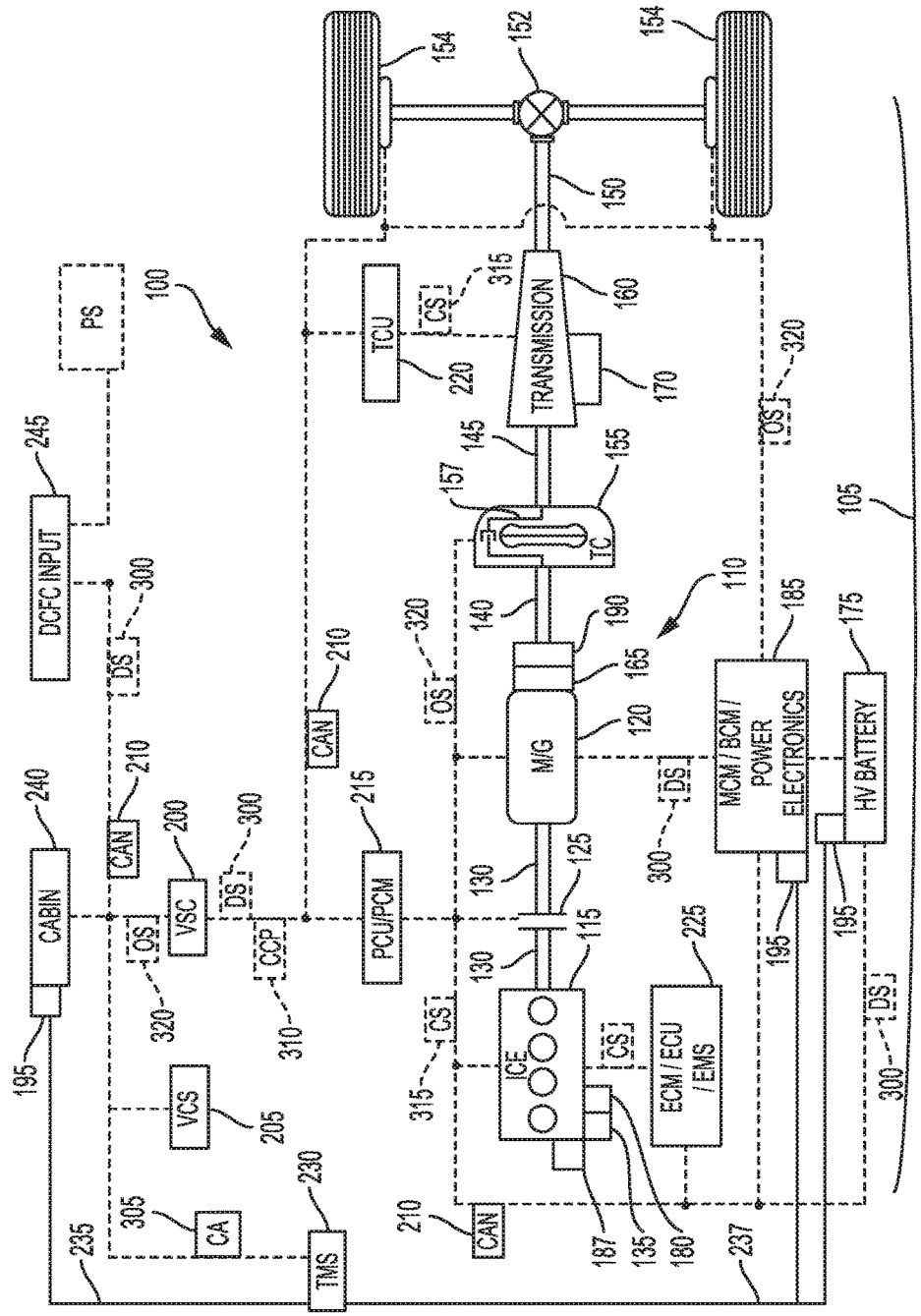
FIG. 1 is an illustration of a hybrid electric vehicle and its systems, components, sensors, actuators, and methods of operation.

With reference now to the various figures and illustrations and to FIGS. 1, 2, 3, 4, 5, and 6, and also specifically to FIG. 1, a schematic diagram of an electric vehicle (EV), plug-in hybrid electric (PHEV), and/or hybrid electric vehicle (referred to individually and collectively hereafter as "HEV") 100 is shown, and illustrates representative relationships among components of EV, PHEV, HEV 100. Physical placement and orientation of the components within vehicle 100 may vary. Vehicle 100 includes a driveline 105 that has a powertrain 110, which includes an internal combustion engine (ICE) 115 and an electric machine or electric motor/generator/starter (M/G) 120, which generate power and torque to propel vehicle 100. Engine 115 is a gasoline, diesel, biofuel, natural gas, or alternative fuel powered engine, or a fuel cell, which generates an output torque in addition to other forms of electrical, cooling, heating, vacuum, pressure, and hydraulic power by way of front end engine accessories described elsewhere herein. Engine 115 is coupled to electric machine or M/G 120 with a disconnect clutch 125. Engine 115 generates such power and associated engine output torque for transmission to M/G 120 when disconnect clutch 125 is at least partially engaged.

M/G 120 may be any one of a plurality of types of electric machines, and for example may be a permanent magnet synchronous motor, electrical power generator, and engine starter 120. For example, when disconnect clutch 125 is at least partially engaged, power and torque may be transmitted from engine 115 to M/G 120 to enable operation as an electric generator, and to other components of vehicle 100. Similarly, M/G 120 may operate as a starter for engine 115 with disconnect clutch 125 partially or fully engaged to transmit power and torque via disconnect clutch drive shafts 130 to engine 115 to start engine 115, in vehicles that include or do not include an independent engine starter 135.

Further, M/G or electric machine 120 may assist engine 115 in a "hybrid electric mode" or an "electric assist mode" by transmitting additional power and torque to turn drive shafts 130 and 140. Also, M/G 120 may operate in an electric only mode wherein engine 115 is decoupled by disconnect clutch 125 and shut down, enabling M/G 120 to transmit positive or negative torque to M/G drive shaft 140. When in generator mode, M/G 120 may also be commanded to produce negative torque and to thereby generate electricity for charging batteries and powering vehicle electrical systems, while engine 115 is generating propulsion power for vehicle 100. M/G 120 also may enable regenerative braking by converting rotational, kinetic energy from powertrain 110 and/or wheels 154 during deceleration, into regenerated electrical energy for storage, in one or more batteries 175, 180, as described in more detail below.

Disconnect clutch 125 may be disengaged to enable engine 115 to stop or to run independently for powering engine accessories, while M/G 120 generates drive power and torque to propel vehicle 100 via M/G drive shaft 140, torque convertor drive shaft 145, and transmission output drive shaft 150. In other arrangements, both engine 115 and M/G 120 may operate with disconnect clutch 125 fully or partially engaged to cooperatively propel vehicle 100 through drive shafts 130, 140, 150, differential 152, and wheels 154. Driveline 105 may be further modified to enable regenerative braking from one or any wheel 154 using a selectable and/or controllable differential torque capability.

Drive shaft 130 of engine 115 and M/G 120 may be a continuous, single, through shaft that is part of, and integral with M/G drive shaft 140, or may be a separate, independent drive shaft 130 that may be configured to turn independently of M/G drive shaft 140, for powertrains 110 that include multiple, inline, or otherwise coupled M/G 120 configurations. The schematic of FIG. 1 also contemplates alternative configurations with more than one engine 115 and/or M/G 120, which may be offset from drive shafts 130, 140, and where one or more of engines 115 and M/Gs 120 are positioned in series and/or in parallel elsewhere in driveline 105, such as between or as part of a torque convertor and a transmission, off-axis from the drive shafts, and/or elsewhere and in other arrangements. Still other variations are contemplated without deviating from the scope of the present disclosure.

Driveline 105 and powertrain 110 also include a transmission that includes a torque convertor (TC) 155, which couples engine 115 and M/G 120 of powertrain 110 with and/or to a transmission 160. Transmission 160 may be a multiple step-ratio, and/or a multiple and variable torque-multiplier-ratio, automatic and/or manual transmission or gearbox 160 having a plurality of selectable gears. TC 155 may further incorporate a bypass clutch and clutch lock 157 that may also operate as a launch clutch, to enable further control and conditioning of the power and torque transmitted from powertrain 110 to other components of vehicle 100.

In other variations, a transmission oil pump 165 is included and is coupled to M/G 120 to produce hydraulic oil pressure for any number of components, which can include, for example, release or disconnect clutch 125, torque converter 155, bypass clutch 157, and transmission 160, when engine 115 is decoupled and/or powered down. An electric auxiliary transmission oil pump 170 may also be included for use alone or in combination with other components, and to also supplement and/or generate hydraulic pressure when both engine 115 and M/G 120 are unpowered, or otherwise unable to produce hydraulic pressure.

Powertrain 110 and/or driveline 105 further include one or more batteries 175, 180. One or more such batteries can be a higher voltage, direct current battery or batteries 175 operating in ranges between about 48 to 600 volts, and sometimes between about 140 and 300 volts or more or less, which is/are used to store and supply power for M/G 120 and during regenerative braking, and for other vehicle components and accessories. Other batteries can be a low voltage, direct current battery(ies) 180 operating in the range of between about 6 and 24 volts or more or less, which is/are used to store and supply power for starter 135 to start engine 115, and for other vehicle components and accessories.

Batteries 175, 180 are respectively coupled to engine 115, M/G 120, and vehicle 100, as depicted in FIG. 1, through various mechanical and electrical interfaces and vehicle controllers, as described elsewhere herein. High voltage M/G battery 175 is also coupled to M/G 120 by one or more of a motor control module (MCM), a battery control module (BCM), and/or power electronics 185, which are configured to condition direct current (DC) power provided by high voltage (HV) battery 175 for M/G 120. MCM/BCM/power electronics 185 are also configured to condition, invert, and transform DC battery power into three phase alternating current (AC) as is typically required to power electric machine or M/G 120. MCM/BCM 185/power electronics is also configured to charge one or more batteries 175, 180 with energy generated by M/G 120 and/or front end accessory drive components, and to supply power to other vehicle components as needed.

Vehicle 100 may also incorporate one or more refrigerant compressors 187, which may be an ICE-mounted or belt driven front end accessory device, and/or an electrically driven and/or operated device mounted on or about the ICE 115 or elsewhere on EV, PHEV, HEV 100, for example such as about M/G 120 to be powered thereby. Cooperatively coupled to the compressor(s) 187, at least one chiller 190 may also be incorporated to enable heat exchange between refrigerant from the compressor(s) 187 and other components. As with the compressor(s) 187, the chiller(s) 190 may be ICE-mounted/belt-driven as a front end accessory, mounted about M/G 120 to enable integral pumps to be driven thereby, or elsewhere about HEV 100. Heat exchangers such as evaporators 195 may be coupled with one or more of the compressor(s) 187 and the chiller(s) 190 to enable heat exchange with passenger compartments of HEV 100, battery(ies) 175, 180, MCM/BCM/power electronics 185, and other vehicle components that may require heating and/or cooling.

With continued reference to FIG. 1, vehicle 100 further includes one or more controllers and computing modules and systems, in addition to MCM/BCM/power electronics 185, which enable a variety of vehicle capabilities. For example, vehicle 100 may incorporate a vehicle system controller (VSC) 200 and a vehicle computing system (VCS) and controller 205, which are in communication with MCM/BCM 185, other controllers, and a vehicle network such as a controller area network (CAN) 210, and a larger vehicle control system and other vehicle networks that include other micro-processor-based controllers as described elsewhere herein. CAN 210 may also include network controllers in addition to communications links between controllers, sensors, actuators, and vehicle systems and components.

While illustrated here for purposes of example, as discrete, individual controllers, MCM/BCM 185, VSC 200 and VCS 205 may control, be controlled by, communicate signals to and from, and exchange data with other controllers, and other sensors, actuators, signals, and components that are part of the larger vehicle and control systems and internal and external networks. The capabilities and configurations described in connection with any specific micro-processor-based controller as contemplated herein may also be embodied in one or more other controllers and distributed across more than one controller such that multiple controllers can individually, collaboratively, in combination, and cooperatively enable any such capability and configuration. Accordingly, recitation of "a controller" or "the controller(s)" is intended to refer to such controllers both in the singular and plural connotations, and individually, collectively, and in various suitable cooperative and distributed combinations.

Further, communications over the network and CAN 210 are intended to include responding to, sharing, transmitting, and receiving of commands, signals, data, control logic, and information between controllers, and sensors, actuators, controls, and vehicle systems and components. The controllers communicate with one or more controller-based input/output (I/O) interfaces that may be implemented as single integrated interfaces enabling communication of raw data and signals, and/or signal conditioning, processing, and/or conversion, short-circuit protection, circuit isolation, and similar capabilities. Alternatively, one or more dedicated hardware or firmware devices, controllers, and systems on a chip (SoCs) may be used to precondition and preprocess particular signals during communications, and before and after such are communicated.

In further illustrations, MCM/BCM 185, VSC 200, VCS 205, CAN 210, and other controllers, may include one or more microprocessors or central processing units (CPU) in communication with various types of computer readable storage devices or media. Computer readable storage devices or media may include volatile and nonvolatile storage in read-only memory (ROM), random-access memory (RAM), and non-volatile or keep-alive memory (NVRAM or KAM). NVRAM or KAM is a persistent or non-volatile memory that may be used to store various commands, executable control logic and instructions and code, data, constants, parameters, and variables needed for operating the vehicle and systems, while the vehicle and systems and the controllers and CPUs are unpowered or powered off. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing and communicating data.

With attention invited again to FIG. 1, vehicle 100 also may include VCS 205 to be the SYNC onboard vehicle computing system manufactured by the Ford Motor Company (See, for example, U.S. Pat. No. 9,080,668). Vehicle 100 also may include a powertrain control unit/module (PCU/PCM) 215 coupled to VSC 200 or another controller, and coupled to CAN 210 and engine 115, M/G 120, and TC 155 to control each powertrain component. A transmission control unit (TCU) 220 is also coupled to VSC 200 and other controllers via CAN 210, and is coupled to transmission 160 and also optionally to TC 155, to enable operational control. An engine control module (ECM) or unit (ECU) or energy management system (EMS) 225 may also be included having respectively integrated controllers and be in communication with CAN 210, and is coupled to engine 115 and VSC 200 in cooperation with PCU 215 and TCU 220 and other controllers.

In this arrangement, VSC 200 and VCS 205 cooperatively manage and control the vehicle components and other controllers, sensors, and actuators. For example, the controllers may communicate control commands, logic, and instructions and code, data, information, and signals to and/or from engine 115, disconnect clutch 125, M/G 120, TC 155, transmission 160, batteries 175, 180, and MCM/BCM/power electronics 185, and other components and systems. The controllers also may control and communicate with other vehicle components known to those skilled in the art, even though not shown in the figures. The embodiments of vehicle 100 in FIG. 1 also depict exemplary sensors and actuators in communication with vehicle network and CAN 210 that can transmit and receive signals to and from VSC 200, VCS 205, and other controllers.

For further example, various other vehicle functions, actuators, and components may be controlled by the controllers within the vehicle systems and components, and may receive signals from other controllers, sensors, and actuators, which may include, for purposes of illustration but not limitation, fuel injection timing and rate and duration, throttle valve position, spark plug ignition timing (for spark-ignition engines), intake/exhaust valve timing and duration, front-end accessory drive (FEAD) components such as air conditioning (A/C) refrigerant compressor 187, transmission oil pumps 165, 170, a FEAD alternator or generator, M/G 120, high and low voltage batteries 175, 180, and various sensors for battery charging or discharging (including sensors for determining the maximum charge, state of charge—SoC, and discharge power limits), temperatures, voltages, currents, and battery discharge power limits, clutch pressures for disconnect clutch 125, bypass/launch clutch 157, TC 155, transmission 160, and other components. Sensors communicating with the controllers and CAN 210 may, for further example, establish or indicate turbocharger boost pressure, crankshaft position or profile ignition pickup (PIP) signal, engine rotational speed or revolutions per minute (RPM), wheel speeds (WS1, WS2, etc.), vehicle speed sensing (VSS), engine coolant temperature (ECT), intake manifold air pressure (MAP), accelerator pedal position sensing (PPS), brake pedal position sensing (BPS), ignition switch position (IGN), throttle valve position (TP), ambient air temperature (TMP) and component and passenger cabin/compartment temperatures, barometric pressure, engine and thermal management system and compressor and chiller pressures and temperatures, pump flow rates and pressures and vacuums, exhaust gas oxygen (EGO) or other exhaust gas component concentration or presence, intake mass air flow (MAF), transmission gear, ratio, or mode, transmission oil temperature (TOT), transmission turbine speed (TS), torque convertor bypass clutch 157 status (TCC), and deceleration or shift mode (MDE), among others.

Figure 2:
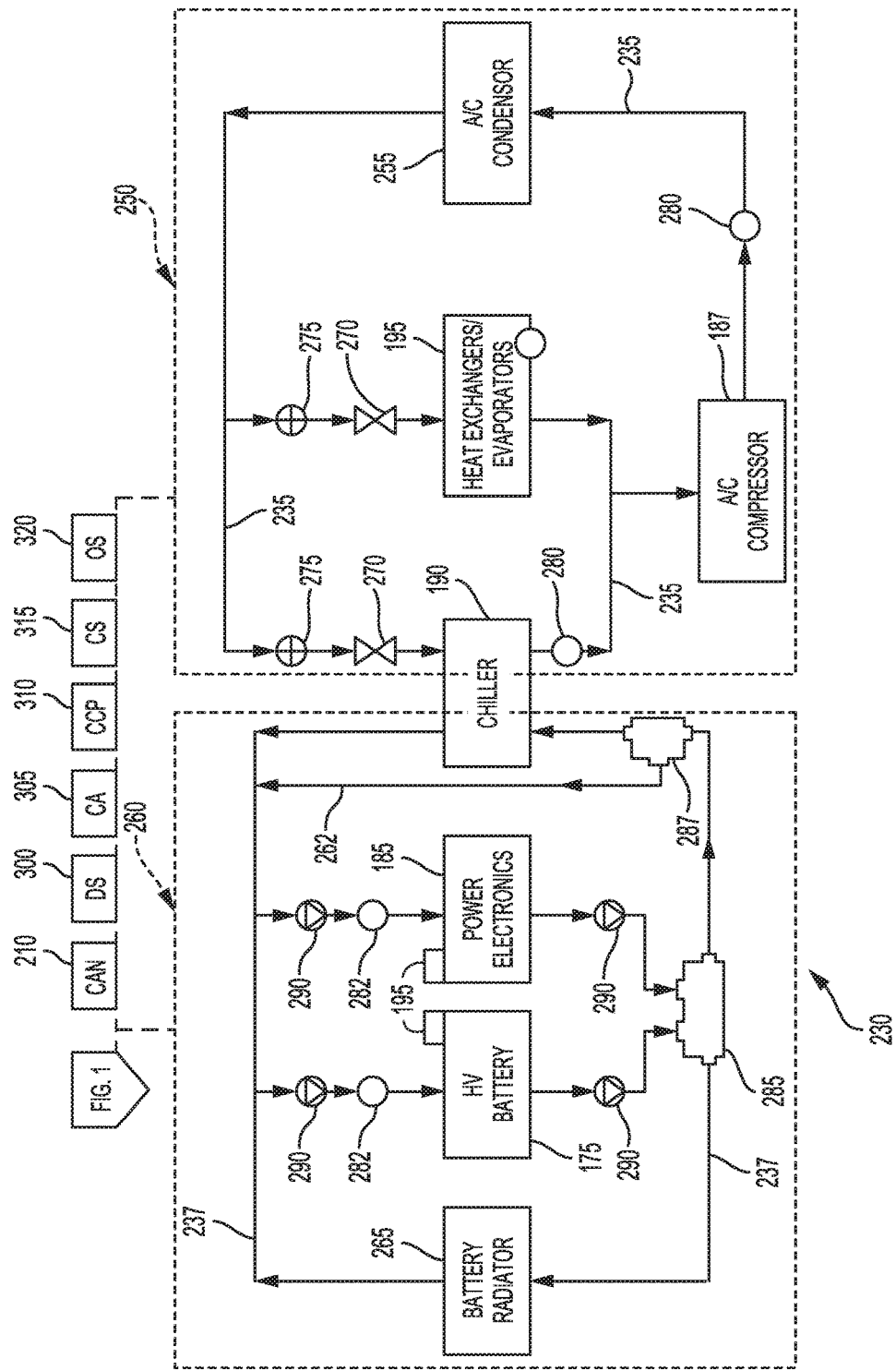
FIG. 2 illustrates certain aspects of the disclosure depicted in FIG. 1, with components removed and rearranged for purposes of illustration.

With continuing reference to the various figures, especially now FIGS. 1 and 2, the disclosure contemplates HEV 100 including ICE 115 coupled with electric machine or M/G 120 and high-voltage (HV) storage battery 175 and MCM/BCM/power electronics 185. At least one of an engine mounted/belt-driven and/or an electrically operated refrigerant compressor 187 and/or chiller 190 are incorporated, and each are configured having respective cooling capacities (CC) and form and are coupled to refrigerant and coolant distribution and thermal management system (TMS) 230. TMS 230 includes refrigerant lines 235 and coolant lines 237, which communicate refrigerant and coolant between compressor 187 and chiller 190, and the heat exchangers and/or evaporators 195 located about a passenger cabin 240 and HV battery 175 and power electronics 185.

EV, PHEV, HEV 100 and TMS 230 also include one or more controllers coupled to these and other HEV components. Such controllers, including for example, those incorporated with power electronics 185 are configured to charge the battery(ies), and to adjust and control a charge-rate and charge-time therefor, and to discharge and deliver power from the battery(ies). These controller(s), including for example those included with TMS 230, manage distribution of CC to control the temperatures of the cabin 240, and HV battery 175 and coupled power electronics 185. The temperatures and charge-rate are controlled according to cooling needs (CNs) established from an ambient temperature within and external to the HEV, a predetermined cabin temperature and charge-time, as well as various instantaneous temperatures of other HEV components, including cabin 240, battery 175, and power electronics 185.

HEV 100 also includes at least one direct-current fast-charge (DCFC) receptacle 245, which is coupled with the various controllers, including for example BCM/MCM/power electronics 185 and HV battery 175. DCFC receptacle 245 is utilized when HEV 100 is stationary and parked adjacent to an external power source (PS) (FIG. 1), such as in a home, office, or other electrical power charging station or location. These controllers are configured to detect the presence of PS when it is connected to DCFC receptacle 245, and to initiate a high-speed, high-charge-rate charging of HV battery 175, battery 180, as well as enabling power to be supplied to HEV 100 chiller 190 for cooling battery 175 and power electronics 185. Such controllers may also enable communication between HEV 100 and external PS to establish power capacity, cost of power, power use authorization, compatibility, and other parameters and information about and from the external PS.

Such communications between HEV 100 and external PS may enable automated purchase of power for a period of time, and may enable communication between external PS and VSC 200 and VCS 205. This configuration may enable an occupant of HEV 100 may interact to convey power purchase authorization via a display in HEV 100. Additionally, HEV 100 may autonomously interact with both external PS and one or more of VSC 200 and VCS 205 to communicate information there between to enable automated DCFC charging of HEV 100. Such DCFC charging typically is most often contemplated for use with EVs and PHEVs, but also may have applications in certain configurations for HEVs, and is here described in connection with all such EV, PHEV, and HEV applications.

DCFC charging of HEV 100 may cause heating of various components that may include batteries 175, 180, and power electronics 185, among other components. Consequently, TMS 230 may be powered by the power source to enable cooling of such components that may experience heating during DCFC charging. In some configurations, upon detecting external PS and initiating automated or occupant-interactive DCFC, HEV 100 autonomously maximizes charge-rate to thereby minimize charge-time. Such automated DCFC maximized charge-rates may be desirable and convenient with respect to minimizing charge-time. However, in warm climates and environments, occupants of HEV 100 may experience discomfort because known configurations of HEV 100 are not configured to cool cabin 240 during DCFC operations. Typically, DCFC operation requires ICE 115 to be unpowered, such that an ICE-mounted/driven FEAD would not be operational, and which requires for EVs, PHEVs, and certain HEVs an electrically operated compressor(s) 187. Chiller 190 may be powered to cool battery(ies) 175, 180, but in most vehicles, cooling has previously not been available for cabin 240 during DCFC events, which may result in cabin discomfort.

With continued reference to the various figures and specifically now also to FIG. 2, additional details of TMS 230 schematically depict the contemplated HEV 100 thermal management system to have a total cooling capacity (CC) designed to manage the heating and cooling needed to operate HEV 100. Although the disclosure primarily describes various cooling capabilities, for purposes of illustration, those knowledgeable in the relevant fields of technology should understand that TMS 230 is configured to enable both cooling and heating of various components of HEV 100, including for example, batteries 175, 180, cabin 240, and other vehicle components.

TMS 230 is typically configured to include at least one refrigerant circuit 250 that may use a refrigerant such as R134a, which may include refrigerant lines 235 coupling air conditioning (A/C) compressor 187 with an A/C condenser 255, heat exchangers/evaporators 195, and chiller 190, among other components. TMS 230 also may usually include at least one coolant circuit 260 (in addition to any coolant circuit included with ICE 115), which may use a coolant similar to any of a number of commonly available ICE antifreeze coolants, and configured to cool one or more non-ICE 115 components. Coolant circuit 260 may further incorporate coolant lines 237 coupling chiller 190 with one or more non-ICE components, including for example at least one of HV battery 175, BCM/MCM/power electronics 185, and a battery/power electronics radiator 265.

TMS 230 may further incorporate various sensors, pumps, and valves, and can include for example, one or more refrigerant expansion devices, such as electric and/or fixed orifice devices, thermal expansion valves 270, and/or solenoid operated valves 275, which are incorporated about refrigerant circuit 250 and coupled to refrigerant lines 235 and heat exchangers/evaporators 195 and chiller 190. Both refrigerant circuit 250 and coolant circuit 260 may incorporate temperature and pressure sensors 280, and temperature sensors 282, at various locations about refrigerant lines 235 and coolant lines 237, along with electrically actuated and driven multiple-position valves 285 that switch flow between outputs, proportional valves 287 that enable differential flow to multiple outputs, and pumps 290, positioned and configured to control coolant and refrigerant flow and flow rates. The various valves and pumps may also be included and utilized for configurations where the chiller 190 may be utilized for heat transfer between heat exchangers/evaporators 195, cabin 240, and other components of coolant circuit 260. In further arrangements, coolant circuit 260 may include a chiller bypass coolant line 262, which may enable proportional flow with proportional valve 287 between bypass line 262 and chiller 190, for coolant circuit 260 operations during DCFC events when refrigerant circuit 250 is unavailable or otherwise unneeded, and chiller cooling via radiator 265.

To enable DCFC of the HV battery 175 and/or other batteries, one or more of the controllers, such as those included with BCM/MCM/power electronics 185 are configured to detect external PS being connected to DCFC receptacle 245, and to generate and communicate a direct-current-fast-charge signal (DS) 300. In response, the power electronics 185 and/or other controllers initiate and increase the charge-rate of the battery(ies) 175 to decrease and/or minimize the charge-time. Typically, the charge-rate is predetermined when HEV 100 is manufactured, as is the charge-time. Both the predetermined charge-rate and the charge-time may be automatically changed by the controllers during normal use as life-cycle and performance degradation occurs in charge capacity and power transfer, which the controllers detect in battery 175 and power electronics 185.

Concurrent with charging, including during DCFC operation, the controllers of TMS 230 and/or other controllers are configured to operate one or more of refrigerant and coolant circuits 250, 260 to generate and distribute the CC to cabin 240 and to HV battery 175 and power electronics 185. To optimize life-cycle and performance of HV battery 175, and other batteries if included, power electronics 185, and other components, TMS 230 controllers determine a cooling need (CN) for battery 175, power electronics 185, and other components of HEV 100. Among other options, those skilled in the relevant fields of technology should understand that CN may be determined from current temperatures of such components, current cabin temperature, an ambient temperature of the environment around HEV 100, target temperatures of the cabin that may be set or adjusted by occupants (for example, 72 degrees Fahrenheit or 22 degrees Celsius), and predetermined temperatures and/or temperature ranges that are preset during manufacture for optimal operating temperatures of power and related components. In response to the CN determination, TMS 230 controllers and/or other controllers add and/or remove heat and control component temperatures to such predetermined temperatures and/or within such predetermined temperature ranges.

Depending upon design and configuration of the available CC of TMS 230, a portion and/or all of the CC may be required to control the temperature of battery 175 and power electronics 185 to be at predetermined temperatures and/or within the optimal temperature ranges. Preferably, sufficient CC is designed into an improved and more capable TMS 230 to also have CC be available for cooling additional other components of HEV 100 during DCFC events, including for purposes of illustration, cabin 240. In this way, prior HEV configurations that did not enable cooling and/or sufficient cooling of cabin 240 during DCFC events, can be improved whereby occupants of cabin 240 may demand and receive cooling to increase comfort.

In any such contemplated configuration wherein cooling may be available for battery 175, power electronics 185, as well as for cabin 240, what has been needed but unavailable, is a capability that enables vehicle occupants to determine preferences and prioritize how CC is to be distributed during DCFC events between cooling of cabin 240, and battery 175, power electronics 185, and other vehicle components. The disclosure contemplates new configurations wherein a predetermined temperature for cabin 240 may be set by such occupants via one or more vehicle controls, which may include for purposes of example VSC 200 and/or VCS 205, or other temperature controls for cabin 240. Additionally, the disclosure enables such users to prioritize whether available CC should be distributed to enable increased comfort and cooling of cabin 240 as a priority over other components, which may increase charge-time and decrease the possible charge-rate. Similarly, the contemplated improvements also enable users to balance between both the adjustable predetermined cabin temperature and/or target temperature/cabin-temperature-setting, and charge-time and charge-rate, to select an acceptable cabin temperature and charge-time and rate.

These new configurations enable TMS 230 to have increased cooling capabilities during DCFC events when an ICE-mounted/belt-driven FEAD compressor 187 may be unavailable if ICE is turned-off, and/or may be available if electrically driven. This arrangement contemplates TMS 230 being configured to consume a portion of the power from external PS to operate coolant circuit 260, and distribute a portion of the available CC to heat exchangers/evaporators 195 to cool cabin 240. In alternatives, TMS 230 may include an electrically operated compressor 187, which can be utilized in combination with refrigerant circuit 250 and coolant circuit 260 to distribute a portion of the CC to cool cabin 240. In turn, more and/or all CC may be utilized for thermally managing temperatures of battery 175 and power electronics 185 during DCFC operation. In enabling users and occupants of HEV 100 to establish priorities between the predetermined temperature of the cabin 240, and charge-time and charge-rate of battery 175, TMS 230 controllers and/or other controllers may determine respective cooling needs (CN).

Figure 3:
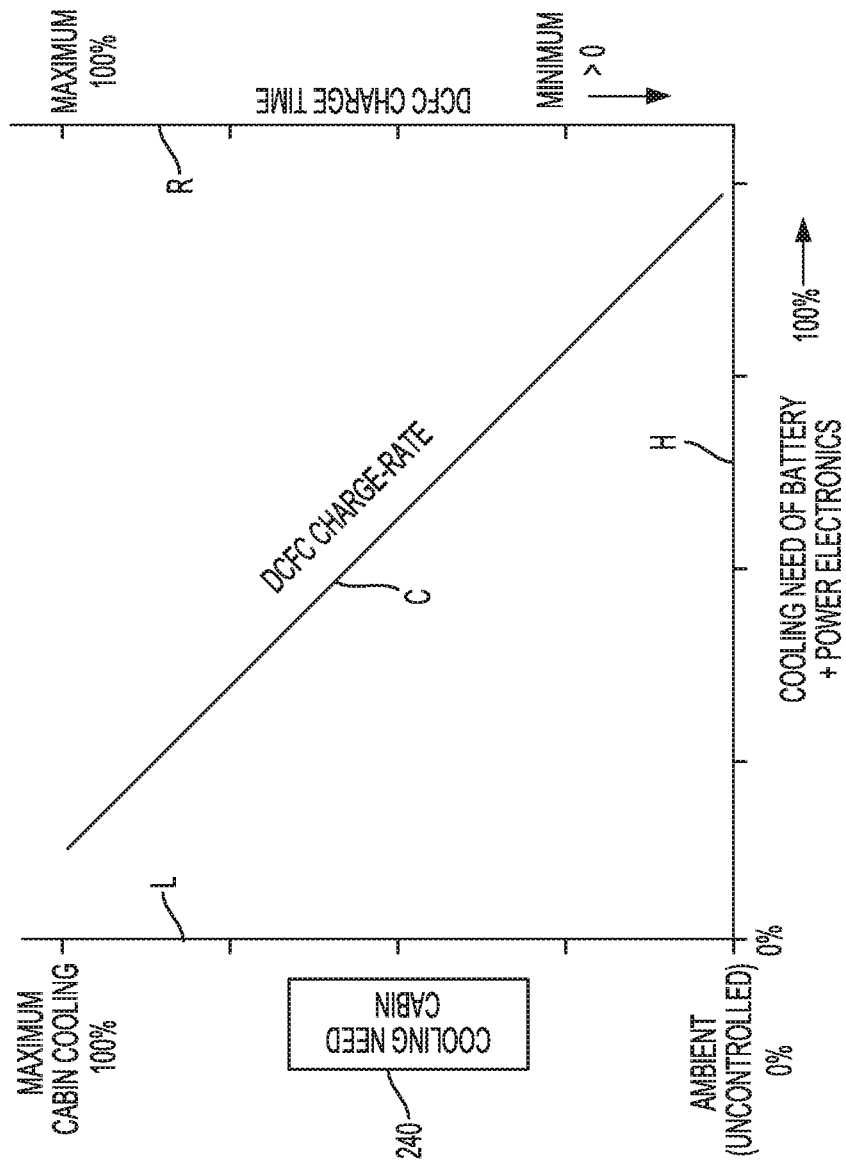
FIG. 3 illustrates additional aspects and capabilities of the vehicle and systems and methods of FIGS. 1 and 2, with certain components removed and rearranged for purposes of illustration.

With continuing reference to the preceding figures, and now also to FIG. 3, it may be understood that in these examples, that as cabin CN is maximized (see, e.g., left vertical axis, "L"), CC is consumed to meet the CN of cabin 240, such that CN of battery 175 and power electronics 185 and charge-rate are decreased. as plotted in an illustrative calibration line "C", against horizontal axis, "H". Consequently, it follows that charge-time increases, as reflected on right vertical axis, "R". In contrast, if the predetermined cabin temperature is increased towards an ambient temperature, as depicted on the left vertical axis, a cooling need (CN) of the cabin is reduced such that less CC is needed to cool cabin 240. Described differently, when CN for cabin 240 is at a maximum, CN available for cooling battery 175 and power electronics 185 as well as possible charge-rate are at a minimum causing the charge-time to be longer. Conversely, as the predetermined temperature of cabin 240 is increased towards an uncontrolled or ambient temperature, the charge-rate may be maximized and charge-time minimized.

During DCFC operation, TMS 230 controllers and others may also be configured to generate and communicate a capacity alert (CA) signal 305 when CN for cabin 240, battery 175, and power electronics 185, and other components, exceed available CC of HEV 100. CA signal 305 may be used to enable prioritization of distribution of CC between cabin comfort and battery cooling, and may be communicated to users via one or more systems of HEV 100 including, for example, VSC 200, VCS 205, or another vehicle control system. When a predetermined cabin temperature is selected by a user or occupant increases CN for the cabin 240 such that when combined with CN for other components causes total CN demanded or required to exceed total available CC, then CA signal 305 is updated, generated, and communicated. Preferably, CA signal 305 may also incorporate information generated by the controllers that enables an alerted user or occupant to determine how the selected predetermined cabin temperature affects charge-time and charge rate.

Figure 4:
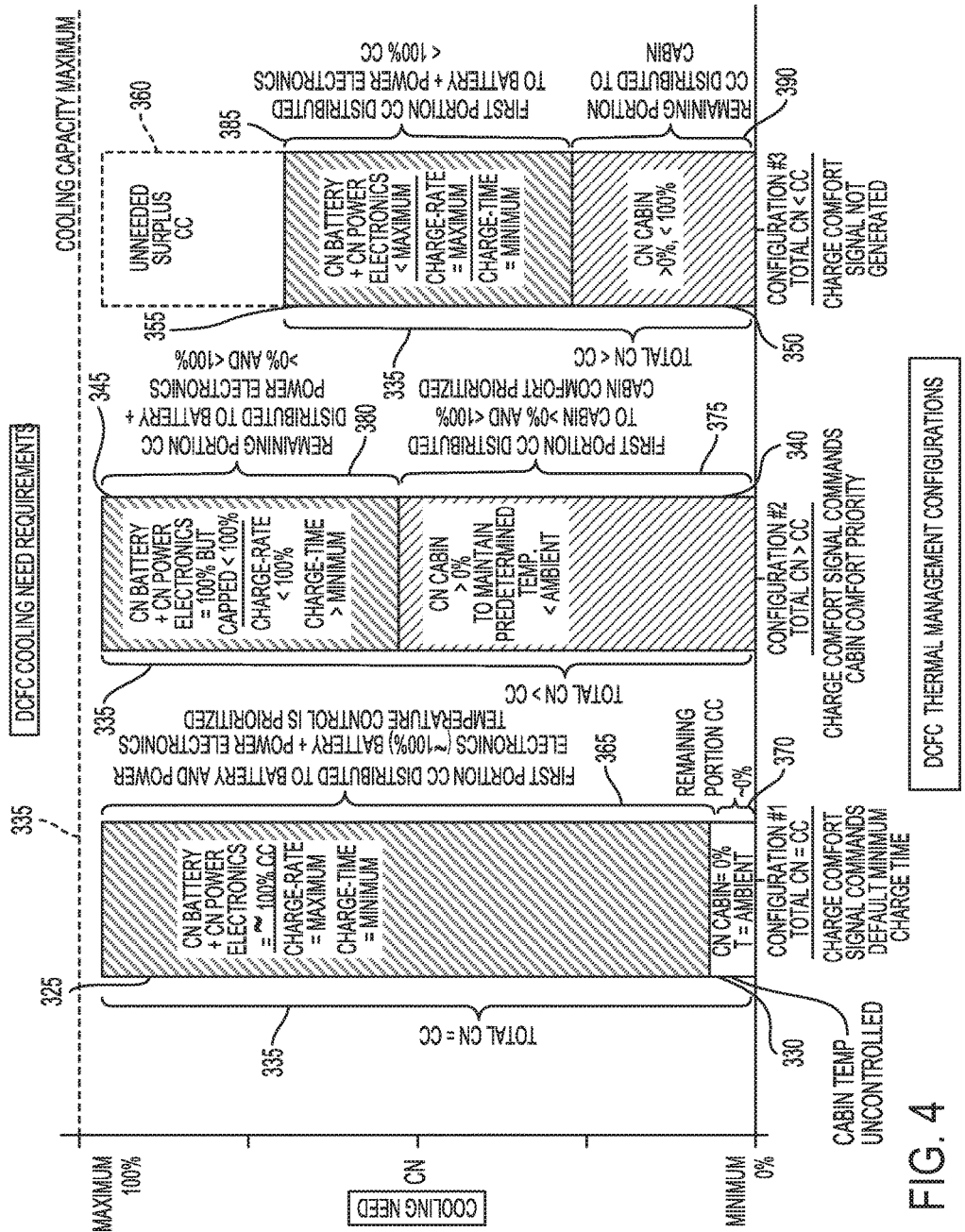
FIG. 4 depicts other aspects of the vehicle systems and methods of FIGS. 1 and 2 and describes various additional capabilities of the contemplated vehicles.

With reference now also specifically to FIG. 4, TMS 230 controllers and/or others may be further adapted to enable VSC 200 and VCS 205 to automatically, and/or interactively with the user or occupant, respond to the CA signal 305 and cause the VSC 200 and/or VCS 205 to generate a charge-comfort-priority (CCP) signal 310, that commands and/or selects a configuration priority to:

(1) maximize charge-rate and minimize charge-time, having CN 325, to leave uncontrolled or to increase any predetermined temperature and reduce CN 330 of cabin 240 whereby most or all CC 335 is available for battery 175 and power electronics 185, (2) adjust and set the predetermined temperature and CN 340 of the cabin 240 to take priority whereby remaining CC balances against and limits the CN 345 of battery 175 and power electronics 185 that in turn limits the charge-rate resulting in an extended charge-time, and (3) automatically balance CN 350 for cabin 240 with a range for predetermined temperature of cabin 240, against a range of charge-times or a selected charge-time that establishes a charge-rate, and wherein CN 350 for cabin 240, and CNs 355 for battery 175, power electronics 185, and other components are periodically adjusted in view of ambient temperature, whereby a surplus or unneeded reserve of CC 360 may be established. In any such configuration, the respective CNs of each component and cabin 240 may be periodically and/or continuously updated in view of possibly changing ambient temperatures.

During DCFC operation, ambient conditions may change whereby ambient temperature may increase or decrease. Further, components of HEV 100 may not heat or cool as much as may be expected in view of predetermined temperature settings and other parameters set and established during manufacturing. Such variants may affect CNs for each component as well as cabin 240. When the total, combined CNs do not exceed available CC 335 or any reason, then the controllers may automatically readjust, for automated convenience of the users, the predetermined temperature and charge-rate for any noted configuration to increase the charge-rate and reduce charge-time to consume any available CC for cooling battery 175 and power electronics 185.

With continued reference to FIG. 4, TMS 230 controller(s) and other controllers may also be configured in the above-noted configuration (1) to control distribution of CC 335 such that a first portion 365 of the CC 335 is apportioned to control the temperatures of battery 175 and power electronics 185 according to CCP signal 310 and an adjusted, maximized charge-rate. A remaining portion 370 of CC 335, if any, is distributed to control the predetermined temperature of the cabin 240, to the extent possible, if any, by what remains of CC 335. In this way, control of the temperatures of battery 175 and the power electronics 185 is prioritized over comfort and cooling of the cabin 240, which may cause an increased or uncontrolled temperature of cabin 240.

In another example according to configuration (2) noted above, the CCP signal 310 may include information to command and maintain the predetermined temperature of cabin 240 as a priority over other cooling needs, which may cause an increased charge-time. In this arrangement, TMS 230 controllers and/or others are further configured to distribute a first portion 375 of CC 335 to control the cabin temperature according to CCP signal 310. A remaining CC portion 380 is distributed to control the temperature of battery 175 and power electronics 185 according to an adjusted and decreased charge-rate, and to the extent possible in view of the remaining CC 380.

These examples and alternatives therefor also contemplate TMS 230 controllers and others being adapted to enable above-noted configuration (3), to periodically re-establish CNs using the ambient temperature, and instantaneous cabin, battery, and power electronics temperatures. If the combined CNs of the cabin, battery, and power electronics during DCFC does not exceed the CC 335, the controller(s) may be further configured to increase the charge-rate, according to increased available CC 335, up to a maximum that minimizes the charge-time, and to distribute a first-portion 385 of the CC 335 to battery 175 and power electronics 185, and to distribute as much of a remaining portion 390 of the CC 335 as may be needed to maintain the predetermined cabin temperature. When the combined, total CN does not exceed the CC 335, the surplus, unneeded portion 360 of the CC 335 may remain unutilized.

As depicted in the various figures, including FIGS. 1, 2, 5, and 6, signals DS 300, CA 305, and CCP 310, and related control logic and executable instructions and other signals, and data can also include other signals (OS) 315, and control or command signals (CS) 320 received from and sent to and between controllers and vehicle components and systems. DS 300, CA 305, CCP 310, OS 315, and CS 320 may be generated, established, communicated, to, from, and between any of the vehicle controllers, sensors, actuators, components, and systems signals. Any or all of these signals can be raw analog or digital signals or preconditioned, preprocessed, combination, and/or derivative signals generated in response to other signals, and may represent voltages, currents, capacitances, inductances, impedances, and digital representations thereof, as well as digital information that embeds such signals, data, and analog, digital, and multimedia information.

Figure 5:
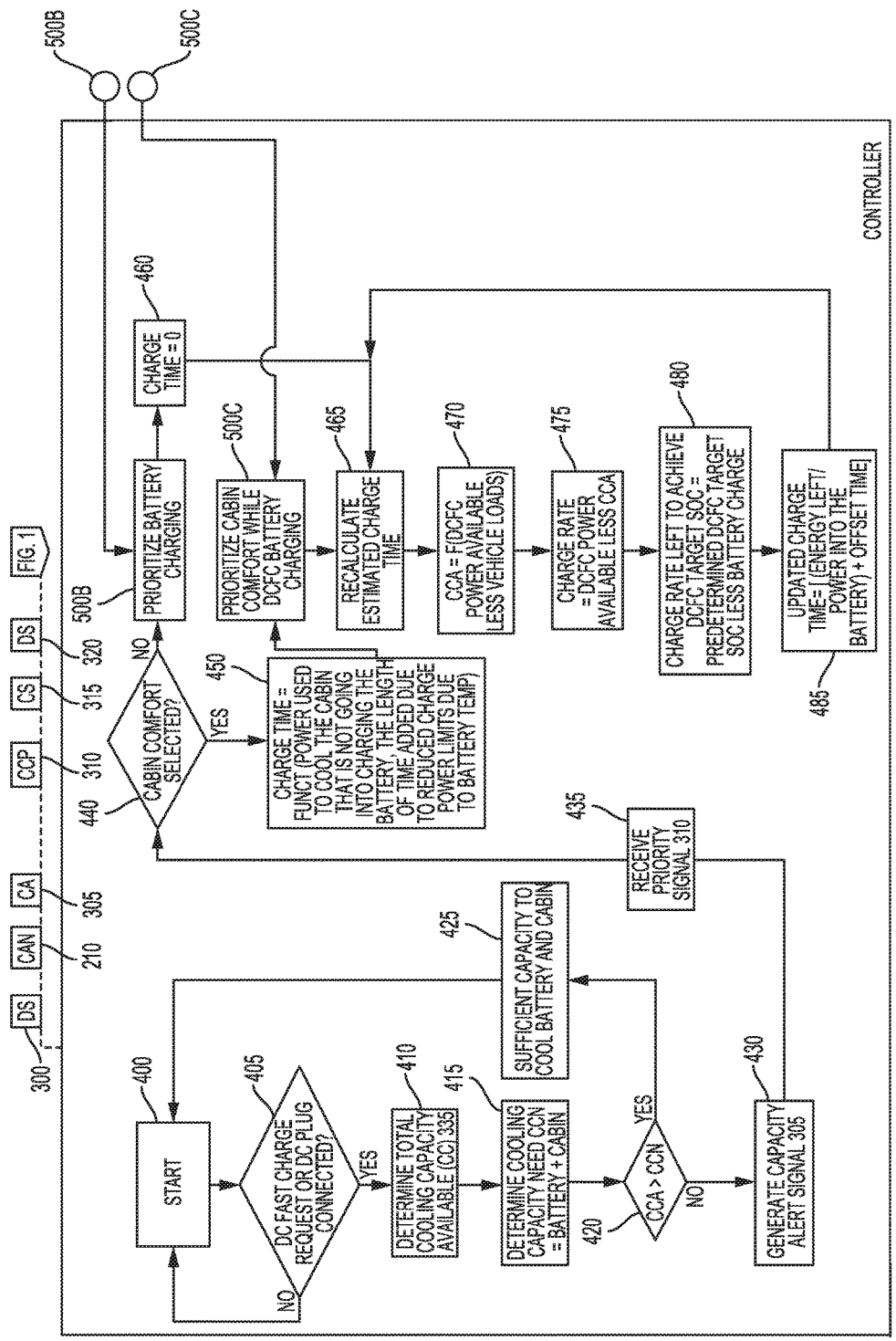
FIGS. 5 and 6 describe examples and method steps that depict other operational capabilities of the disclosure.
Figure 6:
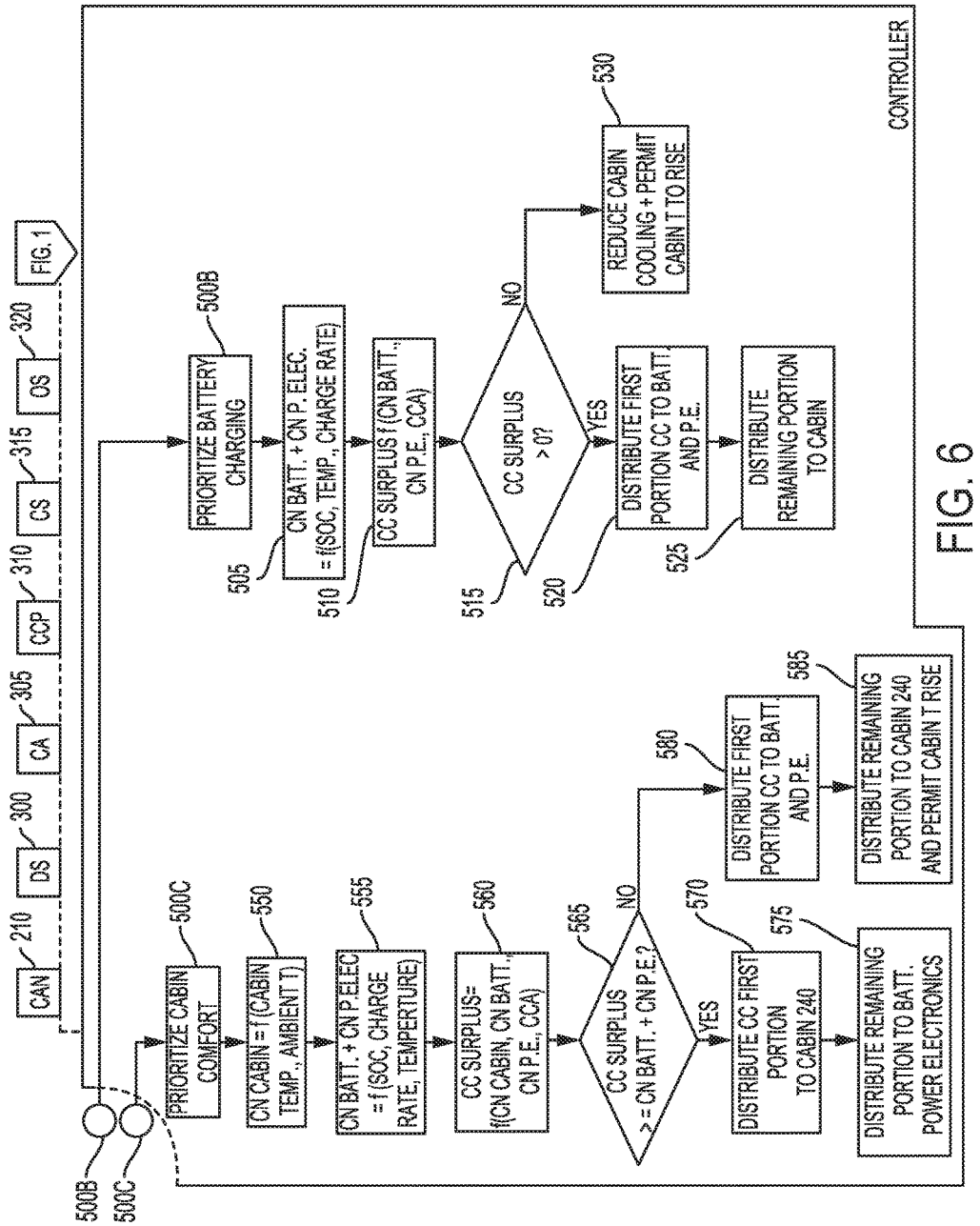

The communication and operation of the described signals, commands, control instructions and logic, and data and information by the various contemplated controllers, sensors, actuators, and other vehicle components, may be represented schematically as shown in FIGS. 1 and 2, and by flow charts or similar diagrams as exemplified in the methods of the disclosure illustrated in FIGS. 5 and 6. Such flow charts and diagrams illustrate exemplary commands and control processes, control logic and instructions, and operation strategies, which may be implemented using one or more computing, communication, and processing techniques that can include real-time, event-driven, interrupt-driven, multi-tasking, multi-threading, and combinations thereof. The steps and functions shown may be executed, communicated, and performed in the sequence depicted, and in parallel, in repetition, in modified sequences, and in some cases may be combined with other processes and omitted. The commands, control logic, and instructions may be executed in one or more of the described microprocessor-based controllers and may be embodied as primarily hardware, software, virtualized hardware, firmware, virtualized firmware, and combinations thereof.

A method of controlling a vehicle such as HEV 100, as depicted in FIGS. 5 and 6, is initiated at step 400 when HEV 100 is stationary and parked, whereupon monitoring is initiated at step 405 for a DCFC request or connection of external PS. Some external PS charging stations or systems may not be compatible for automatically initiating a DCFC request. For such systems, HEV 100 is configured to initiate a DCFC request and signal 300, either autonomously and/or via an interactive use of VSC 200 and/or VCS 205. If a DCFC request or plug-in of DCFC input receptacle 245 are not detected by controllers such as those of MCM/BCM/power electronics 185, control remains at step 405 for continued monitoring. At step 405, upon power electronics 185 or other controllers detecting the connection and/or DCFC request, control passes to step 410 and various information is determined by controllers of power electronics 185 from external PS including power available. With this information, CC 335 may be determined by TMS 230 and other controllers as described elsewhere herein. Once available CC is established, the method next executes step 415 where TMS 230 and other controllers determine CNs for cabin 240, battery 175, power electronics 185, and other vehicle components.

As the method then executes control logic of step 420, it is determined by TMS 230 or other controllers whether total, combined CNs exceed available CC 335, using for example, one or more CNs 330, 325, 340, 345, 350, 355. If available CC 335 is not exceeded by the CNs, then it at step 425 the method establishes that sufficient CC 335 is available for cooling cabin 240, battery 175, power electronics 185, and other components of HEV 100. In this circumstance, above-described configuration (3) is may be initiated such that a surplus or unneeded CC 360 remains available. However, is available CC 335 is exceeded by the combined CNs, then the method executes step 430, and CA signal 305 is generated and communicated by TMS 230 and/or other controllers. As already explained, VSC 200 and/or VCS 205 may autonomously respond to CA signal 305, and may also interactively alert a user or occupant of HEV 100.

Either autonomously and/or interactively, TMS 230 and other controllers at method step 430 enable generation and communication of CCP signal 310, which as described elsewhere herein, further enables prioritization of cooling of cabin 240 and minimized charge-time and maximized charge-rate of HV battery 175. Accordingly, at method step 435, TMS 230 controllers receive CCP signal 310, which at step 440 is tested to determine whether cooling of cabin 240 for occupant comfort is commanded and prioritized over minimum charge-time and maximized and adjustable charge-rate. If charging of battery 175 (minimized charge-time and maximized charge-rate) are commanded and/or prioritized over and instead of cooling of cabin 240, then at step 440, the method passes control to step 500B (FIGS. 5 and 6) to commence charging of battery 175 and for additional battery charging parameter processing and management of charging of battery 175 by TMS 230 and MCM/BCM/power electronics 185 controllers.

In contrast, if cooling of cabin 240 is commanded and/or prioritized instead of charging of battery 175, then the method initiates charging of battery 175 and executes steps 450 and 500C via controllers that may include those of TMS 230 and power electronics 185. Here, the controllers also determine a minimum charge-time and a maximum charge-rate, both of which may be adjusted and increased and decreased, as a function of one or more of ambient temperature, temperature of battery 175, life-cycle and performance of battery 175, available cooling capacity, and external PS power that may be utilized for other components of HEV 100, including power consumed to divert and distribute a portion of CC 335 to cool cabin 240 as established at step 450. The method then passes controller execution to step 500C for further processing of parameters and information by controllers of TMS 230 and others to manage cooling of cabin 240 while charging battery 175.

With continuing reference to the various figures and now also to FIG. 6, it may be understood that if battery charging is commanded and/or prioritized by the controllers over cabin cooling at the steps leading up to step 500B, then the MCM/BCM/power electronics 185 controllers execute step 505 to determine and adjust a minimum charge-time and maximum charge-rate without regard to cabin cooling. Step 505 may by the controllers determine and combine CNs for battery 175, power electronics 185, and other components, as a function of one or more of ambient temperature, state of charge (SoC), life-cycle charge capacity, and other performance parameters of battery 175. Next, such controllers then proceed to execute steps 510 and 515 of the method to determine if a CC surplus 360 results from the difference of available CC 335 and the combined CNs of battery 175 and power electronics 185.

If CC surplus 360 is greater than or equal to zero at step 515, the controllers then proceed to step 520 and operate the circuits 250, 260 to enable configurations (1) or (3) of FIG. 4 to distribute a first portion of CC 365, 385, according to the CCP signal 310 and the predetermined charge-time and adjusted charge rate, to cool and control the temperature of battery 175 and power electronics 185, to enable the minimum possible charge-time at a maximum possible, adjusted charge-rate. Next, control proceeds thereafter to execute step 525 and distribute a remaining portion of CC 370, 390, if any, according to the CCP signal 310, to control the temperature of cabin 240 to maintain predetermined temperature of cabin 240 to the extent possible with the remaining portion of CC 370, 390. In contrast, if at step 515 the controllers determine CC surplus is not greater than zero, then the controllers instead execute step 530 and reduce cabin cooling such that cabin warming is permitted, by increasing the predetermined cabin temperature. The controllers repeat the sequence of the method, returning control to step 500B and other steps until battery charging is completed and/or DCFC operations are discontinued.

The controllers, when configured for DCFC battery charging priority, then return to step 500B and subsequently execute step 460 wherein the minimum charge-time is set to zero, which may indicate that battery charging is prioritized in that the minimum possible charge-time and maximum possible charge-rate is being accomplished during the DCFC operation. The controllers may also determine an actual time to charge, which may be a predetermined charge-time that is set during manufacturing of HEV 100, and which is a function of various life-cycle and performance parameters of battery 175 and power electronics 185. The controllers then execute step 465 to continuously or periodically re-calculate or re-determine and to adjust the charge-rate and an estimated charge-time, which may be communicated and/or displayed via VSC 200 and/or VCS 205.

The controllers next execute step 470 and continuously or periodically re-determine and adjust CC available (CCA) as a function of current or instantaneous DCFC power available from external PS, which may change during DCFC operation, less electrical loads of HEV 100, which may also change during DCFC operation. At step 475, the controllers of the method also may re-determine and adjust the charge-rate as a function of DCFC power available from external PS, less power utilized to make available the previously determined CCA. Executing step 480, the controllers then also may determine and adjust the charge-rate remaining or available to achieve a predetermined or target SoC, as a function of a predetermined or preconfigured SoC and instantaneous or actual current battery charge level. At step 485 the controllers may also be configured to update the estimated time of step 465, as a function of current SoC of battery 175 and the immediately preceding charge-rate of step 480, upon which control passes back to step 465, and the method repeats until charging of battery 175 is completed and/or DCFC operations are discontinued, or re-prioritization causes a change to prioritize cabin cooling over battery charging so that a different sequence of the method is enabled.

During DCFC operations when cabin cooling is prioritized over battery charging at step 500C, and with continuing reference to FIG. 6, the controllers next execute step 550 and determine CN for cooling of cabin 240 at the predetermined temperature, as a function of ambient temperature and current cabin temperature, among other possible parameters. Next, the method and controllers execute step 555 to determine the CN for battery 175 and power electronics 185. Thereafter, controllers of the method execute control logic of step 560 to determine CC surplus 360 from the difference between available CC and the step 555 combination of CNs for cabin 240, battery 175, power electronics 185, and other parameters. At step 560, the method controllers determine whether CC surplus 360 is greater than or equal to zero, and if it is, then the controllers of the method execute step 570 to control circuits 250, 260 to enable configuration (2) of FIG. 4 to distribute a first portion of CC 375 to cool cabin 240 according to the CCP signal 310 and the predetermined temperature. This is followed by execution of step 575 to distribute a remaining portion of CC 380 to cool battery 175 and power electronics 185, which may require an increased charge-time and reduced charge-rate, so long as cabin cooling remains prioritized over battery charging. The method and controllers then return to step 500C and repeat the sequence until battery charging is completed or DCFC operation is discontinued, or re-prioritization causes a change to prioritize battery charging over cabin cooling such that a different sequence of the method is enabled.

The controllers of the method may instead, at step 565, determine that CC surplus 360 is not great then zero, and then proceed to execute step 580 to enable the configuration (1) of FIG. 4. Here, prioritized cabin cooling must be limited to enable some amount of DCFC charging of battery 175 to occur, which requires a portion of the CC to be made available therefor, and which further requires adjustment to increase the predetermined temperature of cabin 240, thus lowering CN for cabin 240. In this circumstance, the controllers then execute step 580 and distribute a first portion of CC 385 to battery 175 and power electronics 185 according to the adjusted charge-rate, so long as DCFC operation continues and until charging of battery 175 is complete. Then step 585 is executed by the controllers to distribute a remaining portion of CC 390 to cool cabin 240 so long as cabin cooling continues to be prioritized, and until re-prioritization occurs, battery charging is completed, or DCFC operation is discontinued.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle, comprising:
   a battery; and
   a controller configured to charge a direct-current-fast-charge signal, charge the battery,
   responsive to a reduced cooling need defined by ambient and predetermined cabin temperatures, and temperatures of power electronics and the battery, adjust a rate of charge of the battery and a charge time such that the rate is increased to maintain the predetermined cabin temperature,
   responsive to the cooling need exceeding a cooling capacity of a chiller, communicate an alert signal and adjust the predetermined cabin temperature and charge time according to a comfort signal, and
   responsive to the comfort signal commanding a decrease in the predetermined cabin temperature that causes the cooling need to exceed the cooling capacity, decrease the rate such that the adjusted charge time increases, and which corresponds with the remaining cooling capacity available to cool the power electronics and battery.

2. The vehicle according to claim 1, wherein:
   the controller is further configured to,
   distribute a first portion of the cooling capacity to control the temperatures of the battery and power electronics according to the comfort signal and the adjusted rate, and
   distribute a remaining cooling capacity portion to control the predetermined cabin temperature.

3. The vehicle according to claim 1, wherein the comfort signal commands a cabin temperature that causes an increased charge time, and wherein the controller is further configured to
- distribute a first portion of the cooling capacity to control the cabin temperature according to the comfort signal, and
- distribute a remaining cooling capacity portion to control the temperature of the battery and power electronics according to a decreased adjusted rate.

4. The vehicle according to claim 1, wherein the comfort signal commands a minimum charge time that reduces cooling capacity available to maintain and which increases the predetermined cabin temperature and wherein the controller is further configured to
- distribute a first portion of the cooling capacity to the battery and power electronics according to the comfort signal and enable the minimum charge time, and
- distribute a remaining cooling capacity portion to control the cabin temperature according to the increased cabin temperature.

5. The vehicle according to claim 1, wherein the controller is further configured to, responsive to the comfort signal commanding a minimum charge and a maximum rate,
- distribute a first portion of the cooling capacity to control the temperature of the battery and power electronics to enable the commanded charge time and rate, and
- distribute a reduced remaining portion of the cooling capacity to control the temperature of the cabin.

6. The vehicle according to claim, wherein the controller is further configured to
- increase the rate to minimize the charge time, and
- increase the cooling capacity distributed to control the temperature of the battery and the power electronics.

7. A method of controlling a vehicle, comprising:
- charging a battery in response to a direct-current-fast-charge signal; and
- by a controller
  - adjusting temperatures of a cabin, and the battery and coupled power electronics,
  - adjusting a charge time according to an ambient temperature, and a predetermined: cabin temperature and charge time, such that the charge time decreases as a cabin cooling need is reduced
  - communicating an alert signal when the cooling need exceeds a cooling capacity of a chiller,
  - adjusting the predetermined cabin temperature and charge time according to a charge comfort signal,
  - commanding a minimum charge time that causes an increased charge rate and cabin temperature,
  - distributing a first portion of the cooling capacity to the battery and power electronics according to the charge comfort signal and enabling the increased charge rate and minimized charge time, and
  - distributing a remaining cooling capacity portion to control the increased cabin temperature.

8. The method according to claim 7, further comprising:
distributing a first portion of the cooling capacity to control the temperature of the battery and power electronics according to the charge comfort signal and a charge rate adjusted according to the adjusted charge time; and
distributing a remaining cooling capacity portion to control the cabin temperature.

9. The method according to claim 7, further comprising:
commanding by the charge comfort signal a cabin temperature that causes the cooling need to exceed the cooling capacity and a reduced charge rate and increased charge time;
distributing
- a first portion of the cooling capacity to control the temperature of the cabin according to the charge comfort signal, and
- distributing according to the adjusted and decreased charge rate, a remaining cooling capacity portion to control the temperature of the battery and power electronics.

* * * * *

UNITED STATES PATENT AND TRADEMARK OFFICE
CERTIFICATE OF CORRECTION

PATENT NO. : 10,118,460 B1
APPLICATION NO. : 15/584788
DATED : November 6, 2018
INVENTOR(S) : Timothy Noah Blatchley et al.

Page 1 of 1

It is certified that error appears in the above-identified patent and that said Letters Patent is hereby corrected as shown below:

In the Claims

Column 19, Line 30, Claim 6:
After "The vehicle according to claim"
Insert -- 1 --.

Signed and Sealed this
Twenty-second Day of January, 2019

Andrei Iancu
*Director of the United States Patent and Trademark Office*